United States Patent

Takahashi et al.

[11] Patent Number: 6,147,659
[45] Date of Patent: Nov. 14, 2000

[54] TIRE WITH TRANSPONDER AND TRANSPONDER FOR TIRE

[75] Inventors: Osamu Takahashi; Kazuhiro Shimura; Fumito Yatsuyanagi, all of Kanagawa, Japan

[73] Assignee: Yokohama Rubber Co., Ltd., Tokyo, Japan

[21] Appl. No.: 09/077,878

[22] PCT Filed: Oct. 14, 1997

[86] PCT No.: PCT/JP97/03676

§ 371 Date: Jun. 8, 1998

§ 102(e) Date: Jun. 8, 1998

[87] PCT Pub. No.: WO98/16400

PCT Pub. Date: Apr. 23, 1998

[30] Foreign Application Priority Data

Oct. 14, 1996 [JP] Japan .................................. 8-270795
Dec. 12, 1996 [JP] Japan .................................. 8-332291

[51] Int. Cl.⁷ ............................ H01Q 11/12; G08B 13/24
[52] U.S. Cl. .......................... 343/866; 343/741; 340/572
[58] Field of Search ................................... 343/741, 742, 343/866, 867; 340/505, 572, 674, 676; 342/44

[56] References Cited

U.S. PATENT DOCUMENTS 5,319,354  6/1994  Myatt ........................................ 340/572
5,432,518  7/1995  Van Erven ................................. 342/42
5,691,731  11/1997  Van Erven ............................... 343/742

*Primary Examiner*—Tan Ho
*Attorney, Agent, or Firm*—Arent Fox Kintner Plotkin & Kahn, PLLC

[57] ABSTRACT

The present invention relates to a reliable transponder 3 for a tire and a reliable transponder-provided tire which are not broken while the tire runs or the tire is formed or cured, by using various metallic component members used in the tire as an antenna directly connected to the transponder 3 and thereby, further decreasing the transponder 3 in size. For example, by electrically directly connecting the transponder 3 with a conductive wire 131 or bead wire 161 in a jointless belt 13A set to the inner and outer peripheries of the tire, the wire 131 or bead wire 161 is used as the receiving and transmitting antenna of the transponder 3. Thereby, it is possible to decrease the transponder 3 in size and to increase the communication distance between an interrogator and the transponder 3 without increasing the transmission power of the interrogator.

5 Claims, 12 Drawing Sheets

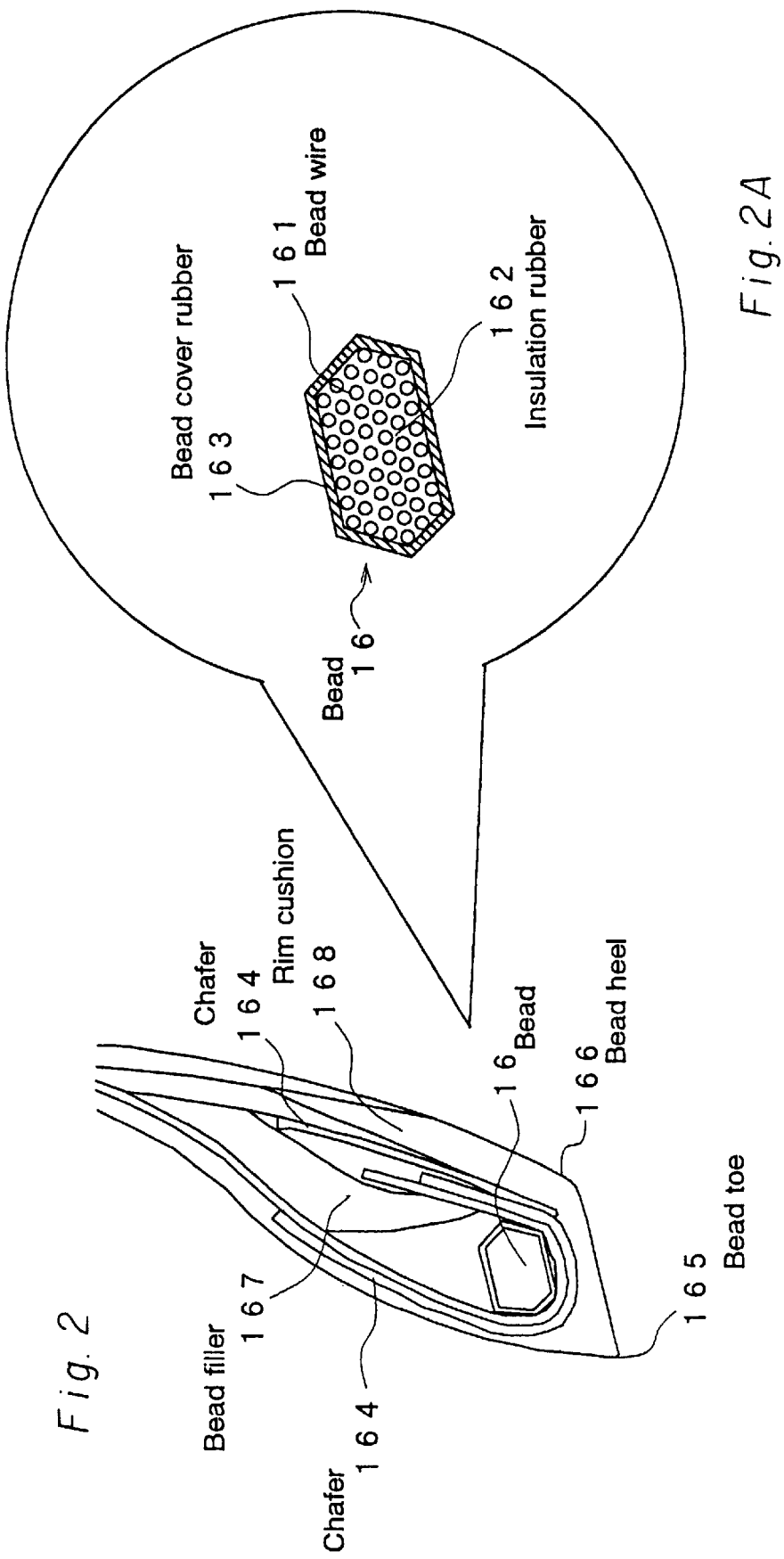

Fig. 3

| | Standard example | Embodiment 1 | Embodiment 2 | Embodiment 3 | Comparative example 1 | Comparative example 2 |
|---|---|---|---|---|---|---|
| NR (SIR-20) | 70.0 | 70.0 | 70.0 | 70.0 | 70.0 | 70.0 |
| SER (NiPCL1502) | 30.0 | 30.0 | 30.0 | 30.0 | 30.0 | 30.0 |
| Carbon black (Seast V) | 100.0 | | | | 70.0 | 20.0 |
| Clay (T-clay) | | 100.0 | 100.0 | 30.0 | 30.0 | 80.0 |
| Silica (NipzilAO) | | | 10.0 | 70.0 | 3.0 | 8.0 |
| Silane coupling agent (Si69) | | | 10.0 | 7.0 | 3.0 | 8.0 |
| Activator (Diethylene glycol) | | | | 7.0 | | |
| Zinc oxide No.3 | 3.0 | 3.0 | 3.0 | 3.0 | 3.0 | 3.0 |
| Industrial stearic acid | 2.0 | 2.0 | 2.0 | 2.0 | 2.0 | 2.0 |
| Aromatic process oil | 10.0 | 10.0 | 10.0 | 10.0 | 10.0 | 10.0 |
| Oil treating powder sulfur | 5.0 | 5.0 | 5.0 | 5.0 | 5.0 | 5.0 |
| Vulcanization accelerator[1] | 1.0 | 1.0 | 1.0 | 1.0 | 1.0 | 1.0 |
| Resistivity peculiar to volume ($\Omega \cdot m$) | $3 \times 10^2$ | $2 \times 10^{13}$ | $3 \times 10^{13}$ | $3 \times 10^{13}$ | $9 \times 10^2$ | $1 \times 10^7$ |

*Fig.* 6
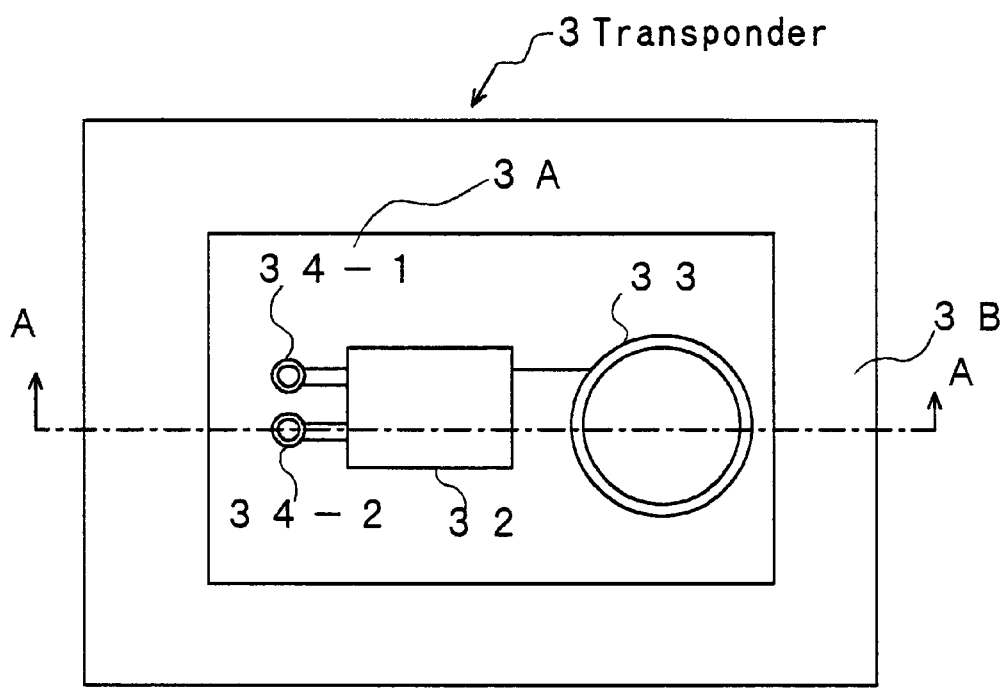
*Fig.* 7
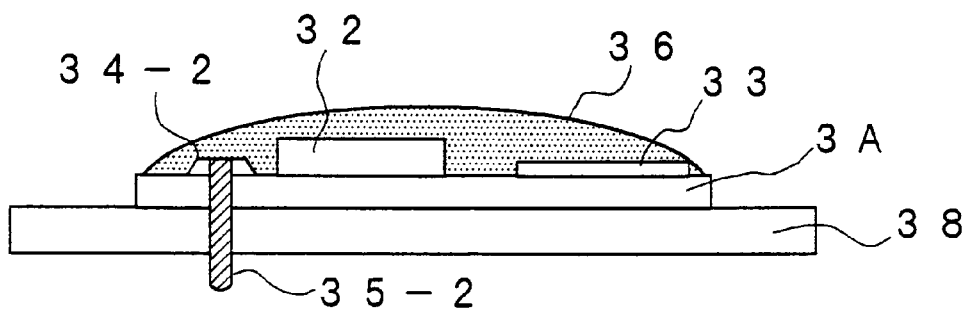

6,147,659

TIRE WITH TRANSPONDER AND TRANSPONDER FOR TIRE

TECHNICAL FIELD

The present invention relates to a transponder-provided tire and a tire transponder making it possible to electronically identify a tire, particularly to the combination of a type of transponder using a metallic member in a tire as an antenna with a tire.

BACKGROUND ART

A transponder-provided pneumatic tire has been known so far in which a transponder storing the information peculiar to a tire (ID information) in an electronic circuit is set for the purpose of automation of manufacturing of tires, and follow-up, and classification, inventory control, shipping, statistical process control, field engineering, theft prevention, maintenance, regeneration control, application to other tires, and identification of tires under and after manufacturing of them (e.g. "transponder-provided pneumatic tire" disclosed in the official gazette of Japanese Utility Model Application Laid-Open No. 2-123404).

The ID information stored in a transponder can include the size, type, manufacturing factory name, manufacturing line number, manufacturing serial number, manufacturing date, shipping date and the like of a tire.

To increase the communication distance between an interrogator and a transponder, it is necessary to increase the interrogation signal (challenge signal) of the interrogator or increase the transmit-receive antenna of the transponder in size. However, this method is not practical when considering the restrictions based on laws and regulations (e.g. the Wireless Telegraphy Act.) and influences of electromagnetic waves on neighboring persons and electronic units.

Moreover, because the transponder uses the energy of an interrogation signal emitted from the interrogator as the driving power source of internal circuits and the energy of response signals, it is a problem how to efficiently receive the energy of limited interrogation signals. This is because the received energy quantity greatly influences the communication distance.

However, when setting the transponder into a tire, it is not preferable to increase the size of an antenna in order to increase a communication distance because the transponder serves as a foreign matter for the tire and thereby, the function of the tire may be deteriorated.

For example, the official gazette of Japanese Patent Laid-Open No. 5-169931 ("pneumatic tire provided with a transponder") discloses a transponder-provided tire which identifies a tire by using the bead wire in a tire as the primary winding of a transformer and thereby, using the coil antenna of the transponder as a secondary winding.

In this case, transfer of an interrogation signal and a response signal between an interrogator and the transponder uses the electromagnetic induction phenomenon. Therefore, the coil antenna of the transponder serving as a secondary winding becomes elliptic and large one provided along a bead core because it is necessary to interlink the magnetic flux emitted from the bead wire serving as a primary winding as much as possible. However, the large antenna of the transponder is not practical because a tire may be damaged while the tire runs or it is formed or cured.

The present invention is made to solve the above problems and its object is to provide a reliable transponder and a transponder-provided pneumatic tire which are not broken while the tire runs or it is formed or cured by using various metallic members used in the tire as an antenna directly connected to the transponder and thereby, further decreasing the size of the transponder. Moreover, it is another object of the present invention to provide a transponder-provided pneumatic tire capable of increasing the communication distance between an interrogator and the transponder without increasing the transmission output of the interrogator.

DISCLOSURE OF THE INVENTION

To achieve the above objects, the present invention constitutes a transponder-provided tire by electrically directly connecting the electronic circuit of a transponder with a predetermined metallic component member in the tire and thereby, using the metallic component member as the transmit-receive antenna of the transponder. Thus, any special antenna is not necessary for the transponder to be embedded in the tire and it is possible to decrease the size of the transponder and greatly reduce the loss for transmission and reception of electromagnetic waves of the transponder compared to the case of the conventional electromagnetic induction type.

Moreover, a bead wire or a conductive wire for forming a jointless belt is preferable as the metallic component member for an antenna to be directly connected to the electronic circuit of a transponder. In this case, the bead wire or the conductive wire for forming a jointless belt is covered with a non-conductive member to prevent the earthing short circuit.

By directly connecting the electronic circuit of the transponder with a bead wire as the antenna of the transponder, it is possible to use the bead wire as a coil antenna because the bead wire is generally formed like a coil of tens of turns and easily and securely receive an electromagnetic field signal emitted from an interrogator. Moreover, because each bead wire is covered with a non-conductive member, it is possible to prevent bead wires from being short-circuited each other and the earthing short circuit through tire rubber and effectively use the bead wire as an antenna. Therefore, it is possible to increase the communication distance between an interrogator and the transponder without increasing the transmission output (electric power) of the interrogator.

Furthermore, by electrically directly connecting the electronic circuit of a transponder with the coil-like conductive wire constituting a jointless belt in a tire as the antenna of the transponder, it is possible to directly use the metallic component member in the outer periphery of the tire as the antenna of the transponder and therefore, it is possible to easily and securely receive an electromagnetic field signal and the like emitted from the interrogator. Furthermore, because non-conductive rubber is used for the rubber for covering each conductive wire of a jointless belt, it is possible to prevent the short circuit between the conductive wires and the earthing short circuit through tire rubber and to effectively use the conductive wire as an antenna. Therefore, it is possible to increase the communication distance between an interrogator and a transponder without increasing the transmission power of the interrogator.

Furthermore, it is possible to easily perform the connecting operation by setting a probe for electrically directly connecting the antenna terminal in the electronic circuit of a transponder to a predetermined metallic component member to the transponder.

Furthermore, it is possible to effectively receive an interrogation signal by setting a small antenna for impedance matching of the metallic component member in a tire used for an antenna and the electronic circuit of a transponder to the transponder and performing the impedance matching in accordance with the metallic component member serving as an antenna and the size of a tire.

BRIEF DESCRIPTION OF THE DRAWINGS

FIG. 2 is enlarged sectional views of a tubeless tire and the bead portion of the tubeless tire;

FIG. 3 is an illustration showing a non-conductive compound blending embodiment in a mode for carrying out the present invention;

FIG. 6 is a plane view showing a transponder in a mode for carrying out the present invention;

FIG. 7 is a sectional view showing a transponder in a mode for carrying out the present invention;

BEST MODE FOR CARRYING OUT THE INVENTION

Before describing the modes for carrying out the present invention, terms used in this specification are described below.

A "pneumatic tire" represents both a tube-provided tire and a tubeless tire.

An "interrogator" represents an apparatus for transmitting a challenge signal (interrogation signal) for challenging a transponder so as to respond a signal including ID information peculiar to the transponder to the transponder and supplying the energy of the interrogation signal to the transponder as the driving power of the electronic circuit in the transponder and the energy of a response signal.

A "receiver" represents an apparatus for receiving a response signal including ID information responded by a transponder when the transponder receives an interrogation signal of an interrogator.

A "bead core" represents an annular tensile member set inside of a tire.

A "bead wire" represents a metallic wire serving as a component of a bead core.

Then, the first mode for carrying out the present invention is described below by referring to the accompanying drawings.

Figure 1:
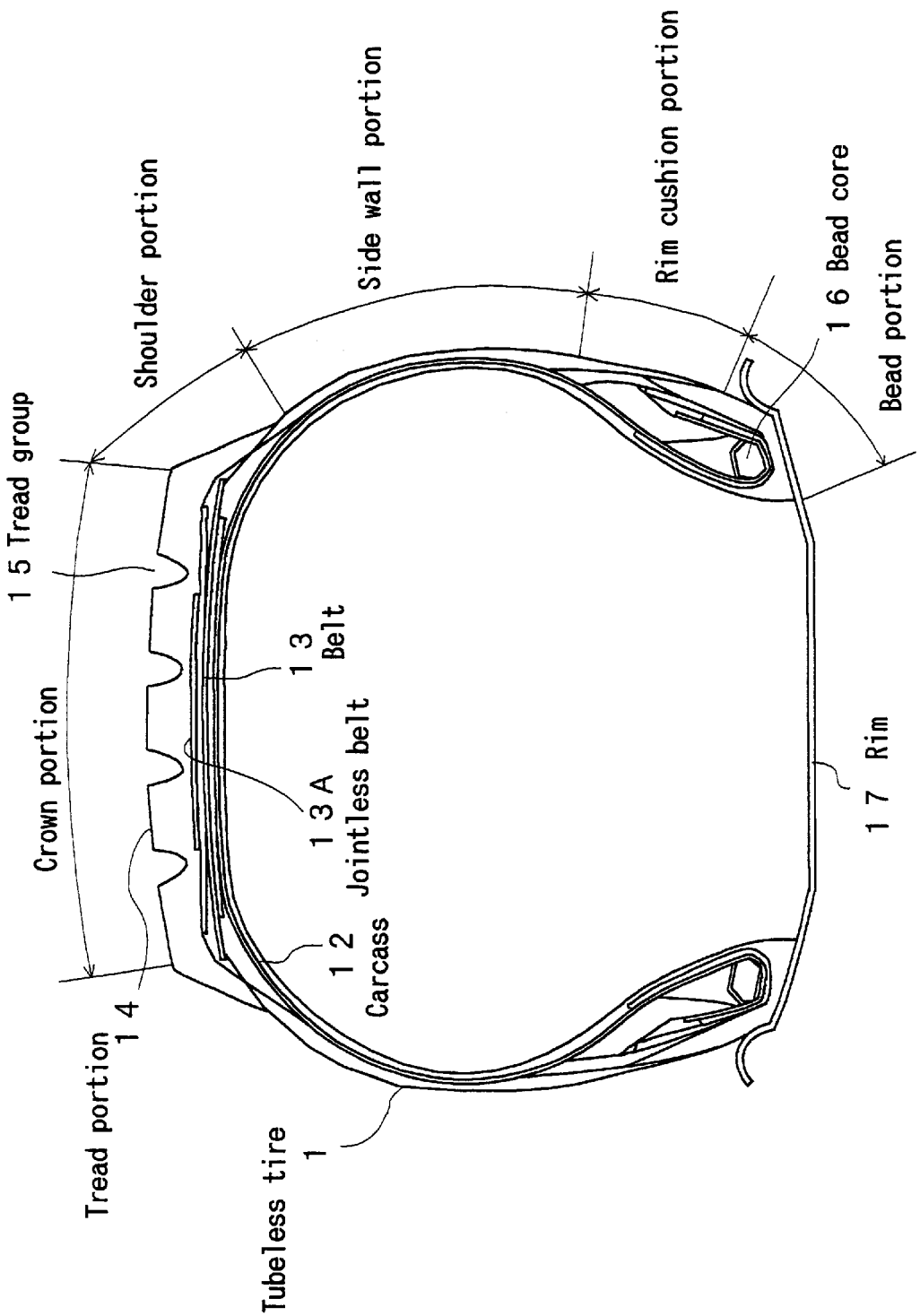
FIG. 1 is a sectional view showing a tubeless tire of the present invention.

FIG. 1 is a sectional view of a tubeless tire. In FIG. 1, symbol 1 denotes a tubeless tire, 12 denotes a steel carcass, 13 denotes a belt, 13A denotes a jointless belt, 14 denotes a tread portion, 15 denotes a tread group, 16 denotes a bead core, and 17 denotes a rim. Moreover, the name of each position of the tire is entered in FIG. 1.

FIG. 2 is an enlarged sectional view of the bead portion of a tubeless tire. In this case, an enlarged view of the bead core 16 is shown at the top left of FIG. 2.

The bead core 16, as shown by the enlarged view, is constituted by winding a bead wire 161 made of a metallic material such as a brass-plated steel wire on the bead core 16 by tens of turns (e.g. 45 turns) so that the cross section of the core 16 becomes almost hexagonal. Insulation rubber 162 is injected between these bead wires 161 and most of the whole of the core 16 except a part of the core 16 is covered with bead cover rubber 163 made of rubber. Symbol 164 denotes a chafer, 165 denotes a bead toe, 166 denotes a bead heel, 167 denotes a bead filler, and 168 denotes a rim cushion.

The bead cover rubber 163 generally covers the entire area of the bead core 16. In the case of this mode for carrying out the present invention, however, since a transponder is electrically connected to the bead core 16, only the portion of the bead core 16 where the transponder is set is exposed.

Moreover, in the case of this mode for carrying out the present invention, the bead wire 161 is covered with a non-conductive member though it is not illustrated.

That is, each piece of rubber constituting a tire is generally conductive because carbon black is used as a reinforcement of the rubber. To use the bead wire 161 inscribed in a tire as an antenna, it is necessary to cover the wire 161 with a non-conductive member such as non-conductive rubber in order to prevent a short circuit.

As the non-conductive rubber, it is preferable to substitute non-conductive silica, clay or the like for carbon black. For example, the following blending example can be shown.

Mixture of the following:

| | |
|---|---|
| NR (SIR-20) | 70 |
| SBR (Nippol 1502) | 30 |
| Silica (NIPPON (transliterated) silica Nipzil AG) | 90 phr (Carbon black 0) |

Other materials: Oil, silane coupling agent, sulfur, vulcanization accelerator, etc.

Types of polymers and curing agent do not influence conductivity. Therefore, it is possible to design a metallic cord other than a bead core in accordance with the purpose of each covering rubber. In this case, it is important to less use or disuse conductive carbon black. It is possible to replace the entire carbon black with silica as shown in the above blending example. When 20 parts of carbon black or less is used for 100 parts of rubber, it is confirmed through experiments that a metallic component member in a tire completely fulfills the function as an antenna. Moreover, even when using carbon black, it is possible to decrease conductivity by increasing the carbon black in diameter. In this case, it is preferable that non-conductive rubber has a resistivity peculiar to volume of $1 \times 10^8$ ($\Omega \cdot m$) and more.

FIG. 3 shows experiment results of blending examples of coat compounds (insulation compounds) used to cover the bead wire 161 or for the insulation rubber 162.

In FIG. 3, the standard example shows the blending of only carbon and has a low resistivity peculiar to volume and therefore, it is easily electrified. However, embodiments 1 to 3 have a high-enough resistivity, they are hardly electrified and thus, a desired effect is obtained. Moreover, as shown by comparative examples 1 and 2, a resistivity peculiar to volume does not greatly rise even after replacing some of carbon with silica.

Figure 4:
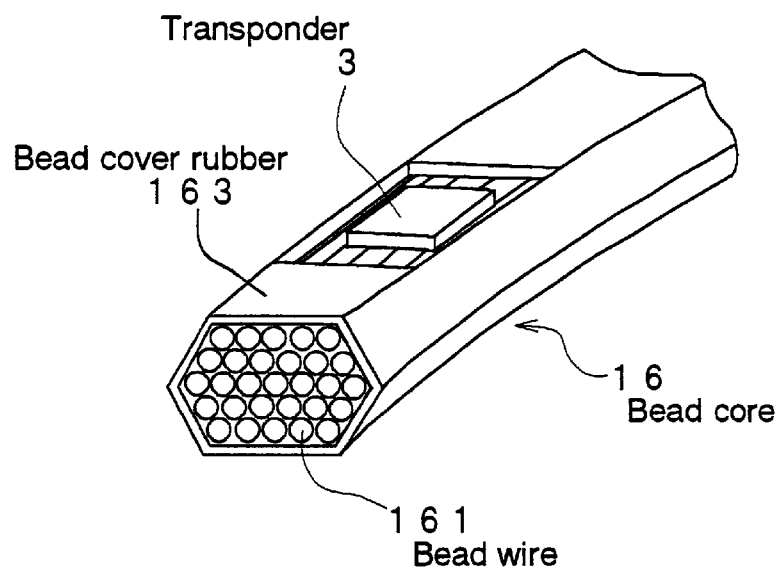
FIG. 4 is an illustration showing the state in which a transponder is set in a bead core in the first mode for carrying out the present invention.

FIG. 4 is an illustration showing the state in which a transponder 3 is set to the portion where a part of a bead core 16 is exposed.

As shown in FIG. 4, the bead core 16 and the electronic circuit of the transponder 3 are electrically directly connected each other and fixed so as to use the bead core 16 as a receiving and transmitting antenna.

The transponder 3 does not include a power supply therein but instead, uses the energy of an interrogation signal transmitted from an interrogator outside of a tire as the operation energy source of the transponder.

The interrogation signal is shaped (rectified) by a circuit in the transponder 3 and then, used to transmit an electric signal digitally coded to identify a tire outside a tire by making full use of the shaped signal as an energy source.

Then, the connection between the transponder 3 and the bead core 16 is described below more minutely.

As described above, the bead core 16 is constituted by winding the bead wires 161 by tens of turns. By constituting the bead wire 161 with a conductive metallic material such as a steel wire, it is possible to generate an electromotive force for electromagnetic induction. In the case of this mode for carrying out the present invention, terminal machining is applied to the originating end and terminating end of the bead wire 161 so as to connect the wire 161 with the probe of the transponder 3 to be described later. The originating and terminating ends of the bead wire 161 are provided for portions where the bead wire 161 is exposed so that the ends can be easily connected with the probe of the transponder 3.

Figure 5:
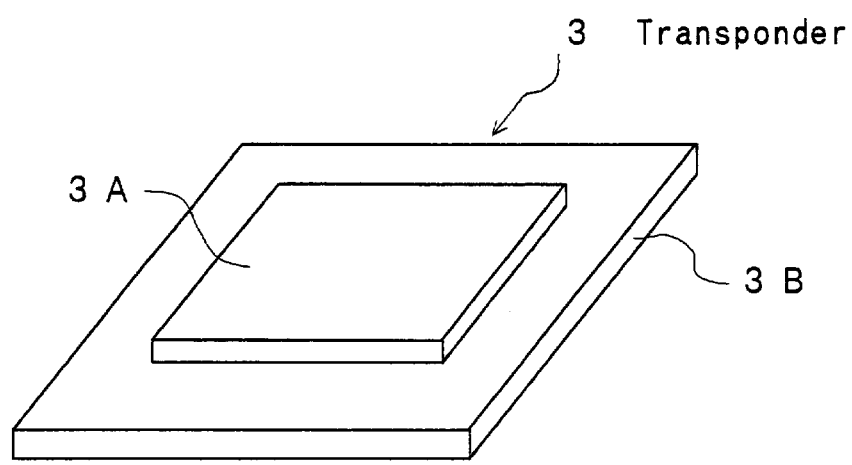
FIG. 5 is a full view showing a transponder in a mode for carrying out the present invention.

FIGS. 5 to 7 are illustrations showing the structure of the transponder 3 in this mode for carrying out the present invention. FIG. 5 is a full view showing the transponder 3 to be set to a tire. In FIG. 5, symbol 3 denotes a transponder which comprises a transponder body 3A and a bonding portion 3B.

Moreover, the bonding portion 3B is attached to the lower side of the transponder body 3A. The bonding portion 3B is made of an elastic member having insulating and adiabatic characteristics so that the transponder 3 can be set to a member to be bonded by applying an adhesive to the bonding portion 3B.

FIG. 6 is a top view of the transponder 3. In the case of the transponder body 3A, an electronic circuit (integrated circuit) 32 and an impedance-matching small antenna 33 are connected to a printed circuit board on which wiring is formed by etching.

Moreover, the board of the transponder body 3A is provided with a terminal 34 (34-1 and 34-2) penetrating the board to the back of the board through a though-hole and the terminal 34 is connected to the electronic circuit 32.

FIG. 7 is a sectional view taken along the line A—A in FIG. 5. As shown in FIG. 7, a probe 35-2 made of a conductive material is set in a terminal 34-2 so as to protrude below the board and the bonding portion 3B of the transponder body 3A. Moreover, though not illustrated, a probe 35-1 is also set so as to penetrate the board of the transponder body 3A from a terminal 34-1 and protrude below the board of the transponder 3A and the bonding portion 3B.

After a probe 35 is soldered to the terminal 34, the upper side of the board of the transponder body 3A is covered with an epoxy resin 36 to protect the electronic circuit 32 from the heat and impact produced in the subsequent manufacturing process and while a tire runs.

When setting the transponder 3 to a tire, the both probes 35-1 and 35-2 are respectively electrically connected to the originating end and terminating end of the bead wire 161 and bonded and fixed to a predetermined member in the tire by applying an adhesive to the bonding portion 3B. The bead core 16 is used as a receiving and transmitting antenna of the transponder 3.

In this case, structures of a transponder are slightly different when using the bead core 16 as a so-called electromagnetic coupling antenna and when using it as an electric-field coupling antenna. The both cases are separately described below.

In the case of the first embodiment below, a case is described in which the bead core 16 is used as the electromagnetic coupling antenna of the transponder 3.

Figure 8:
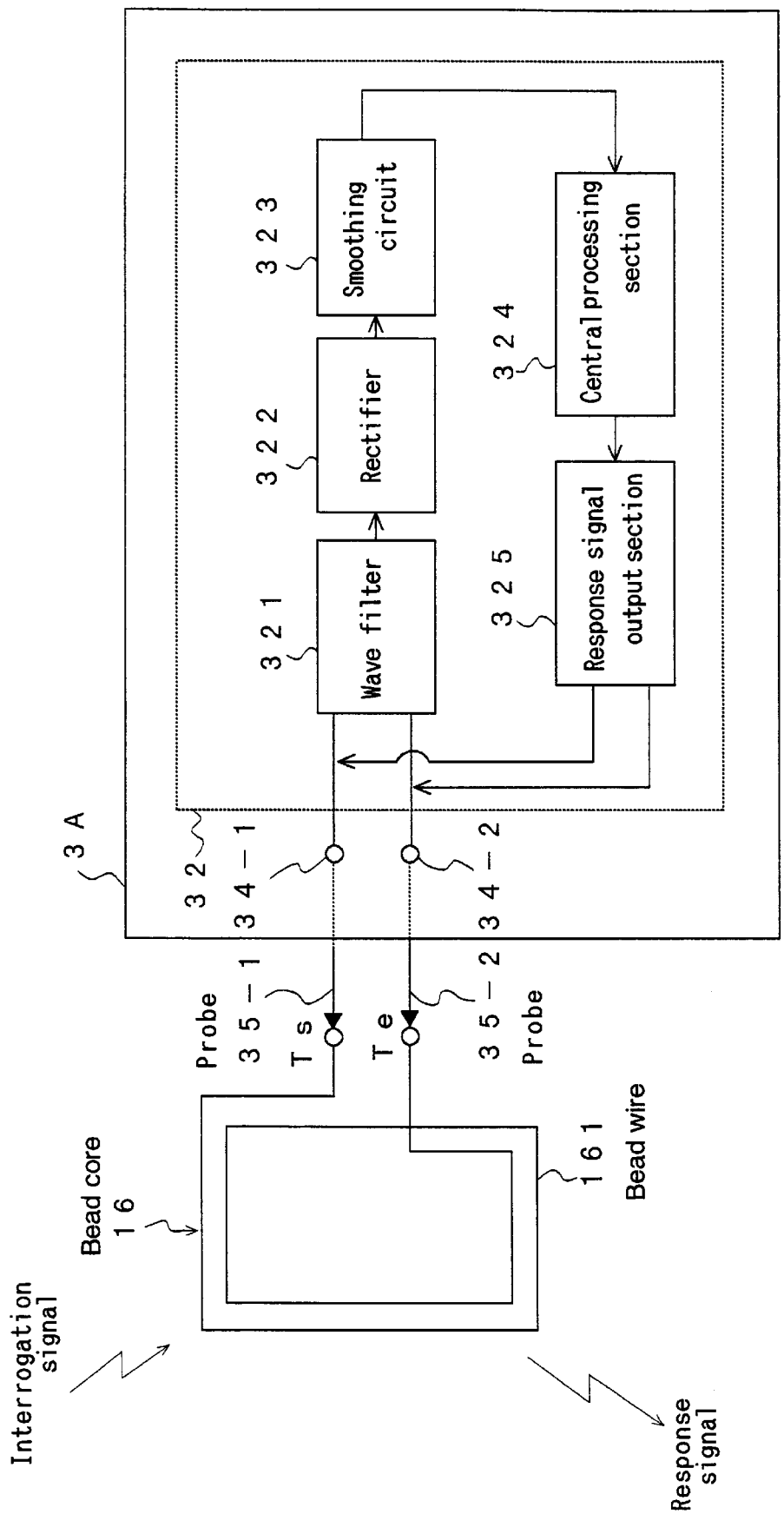
FIG. 8 is a block diagram including the electric circuit of a transponder when using a bead core as an electromagnetic coupling antenna in a mode for carrying out the present invention.

FIG. 8 is an illustration showing a structure including the electric circuit 32 of the transponder 3 when using the bead core 16 as an electromagnetic coupling antenna.

In this case, electromagnetic coupling represents a method of picking up an electromagnetic field signal (electromagnetic wave) sent from an interrogator as an induced current generated in a coil antenna. Therefore, the probes 35-1 and 35-2 connected with the terminals 34-1 and 34-2 of the transponder body 3A so as to pick up the current flowing through the bead core 16 are respectively connected to a terminal Ts of the originating end of the bead wire 161 and a terminal Te of the terminating end of the wire 161.

When an interrogation signal such as an electromagnetic field signal of 500 KHz sent from an interrogator is received by the bead core 16, only frequency components equal to or lower than a predetermined frequency (e.g. 1 MHz) of the current flowing through the bead wire 161 are passed by a wave filter 321 in the electronic circuit 32 of the transponder 3 and full-wave-rectified by a rectifier 322 and then, converted into a direct current by a smoothing circuit 323. The signal converted into a direct current is used as the power for driving a central processing section 324 and other electric circuits.

When the driving power is input, the central processing section 324 first reads the ID information peculiar to the transponder from the memory (not illustrated) of the unit 324, modulates a carrier wave having a predetermined frequency in accordance with the ID information, and thereafter transmits the modulated carrier wave to a response signal output section 325 in order to output the carrier wave as a digitized response signal.

The response signal output section 325 transmits the digitized response signal to a line for the terminals 34-1 and 34-2 to communicate with the wave filter 321 in order to output the digitized response signal to a receiver. Then, the response signal is transmitted to a receiver as an electromagnetic field signal through a transmit-receiver antenna comprising the bead core 16.

In this case, it is preferable to set the frequency of a response signal (carrier wave) including the ID data output from the transponder 3 to a high frequency four times or more higher than the frequency output from an interrogator. For example, when setting the output frequency of the interrogator to 500 KHz as described above, the frequency of the response signal of a transponder is set to 300 MHz. In case the transponder 3 is provided with the wave filter 321 to pass only a current having frequency components equal to or lower than, for example, 1 MHz, a response signal is effectively transmitted to the receiver side without passing through the wave filter 321.

The impedance-matching small antenna 33 comprising inductance components is set between the terminals 34-1 and 34-2 in the case of the first embodiment. Thereby, it is possible to adjust or improve a receiving sensitivity by changing inductances of the small antenna 33, adjusting the impedance in the closed loop of the electronic circuit 32 (that is, performing impedance matching), and eliminating the reflection of a reception signal at a portion where the probe 35 is connected to a metallic component member.

Moreover, when it is intended to use the transponder of this embodiment only for a tire having a predetermined bead inside diameter, the impedance-matching small antenna 33 is not always necessary.

Then, the second embodiment in this mode for carrying out the present invention is described below.

For the second embodiment, a case is described in which the bead core 16 is used as an electric-field coupling antenna of the transponder 3.

Figure 9:
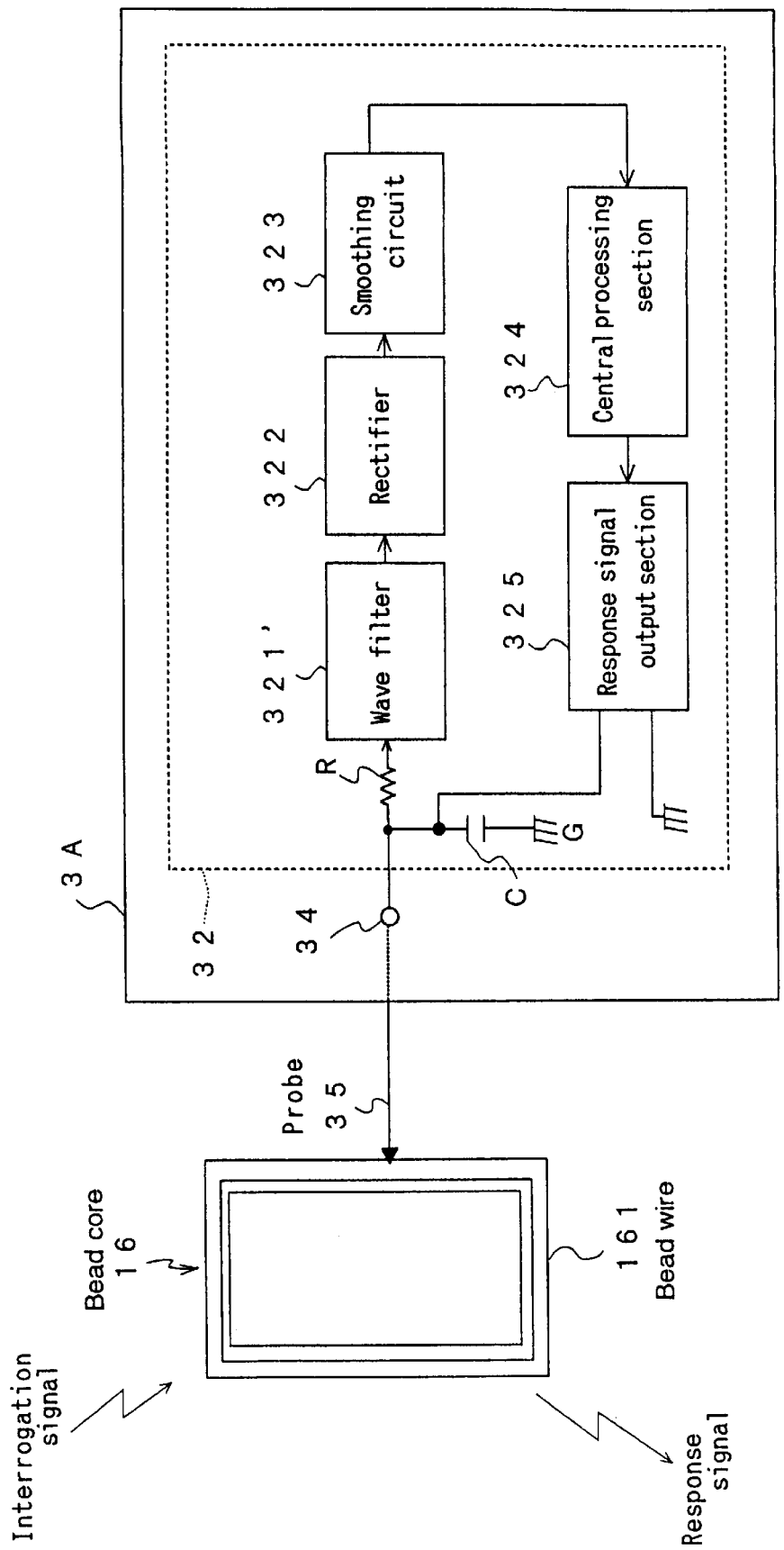
FIG. 9 is a block diagram including the electric circuit of a transponder when using a bead core as an electric-field coupling antenna in a mode for carrying out the present invention.

FIG. 9 is an illustration showing the structure of a transponder including an electric circuit when using the bead core 16 as an electric-field coupling antenna.

In this case, electric-field coupling represents a method of picking up the electric field component of a signal transmitted from an interrogator. The electric field component is generally detected as an absolute value on the basis of an earth. Therefore, it is enough to provide only one probe for a transponder because the bead core 16 only has to pick up an electric field signal on the basis of a predetermined position. When the bead core 16 is a metallic component member to be used as an antenna, it is only necessary to insert the probe of a transponder into a predetermined position of the bead core 16. Specifically, it is enough to insert the probe of the transponder 3 into the bead core 16 and bond and fix the bonding portion 3B to the bead core 16.

In this case, when an interrogation signal from an interrogator such as an electric field signal of 500 KHz is received by the bead core 16, the electric field signal is received by the other electrode of a capacitor (C) connected to an earth (G) and converted into a current through a resistance (R). Then, only frequency components of the current equal to or lower than a predetermined frequency are passed by a wave filter 321' in the electronic circuit 32 of the transponder 3 and full-wave-rectified by the rectifier 322 and then, converted into a direct current by the smoothing circuit 323.

The direct current is used as the power for driving the central processing section 324 and so on. When the driving power is input, the central processing section 324 first reads the ID information peculiar to the transponder concerned from the memory (not illustrated) of the section 324, modulates a carrier wave having a predetermined frequency in accordance with the ID information, and then transmits the carrier wave to the response signal output section 325 in order to output the carrier wave as a response signal.

The response signal output section 325 transmits a response signal including the ID information to a line for the terminal 34 to communicate with a capacitor (C) in order to output the signal to an receiver.

Thereby, the response signal is transmitted to the receiver as an electric field signal through a transmit-receive antenna comprising the bead core 16.

Also in this case, it is preferable to set the frequency of a response signal (carrier wave) including the ID information output from the transponder 3 to a high frequency four times or more higher than the frequency output from an interrogator. This is the same reason as the case of the first embodiment. For example, when setting the output frequency of the interrogator to 500 KHz as described above, the response signal of the transponder is set to 300 MHz. Then, when assuming that only frequency components (current), for example, equal to or lower than 1 MHz pass through the wave filter 321, a response signal is effectively transmitted to the transmission side without passing through the wave filter 321'.

In the case of the second embodiment, the impedance-matching small antenna 33 comprising inductance components is set so as to constitute an LC resonance circuit in parallel with a capacitor C. Thereby, it is possible to adjust a receiving sensitivity, that is, improve a receiving sensitivity by changing inductances of the small antenna 33, adjusting the impedance in the closed loop of the electronic circuit 32 (that is, performing impedance matching) and eliminating the reflection of a reception signal at the joint between the probe 35 and a metallic component material.

Moreover, when it is intended to use the transponder of this embodiment only for a tire having a predetermined bead inside diameter, the impedance-matching small antenna 33 is not always necessary.

In the case of the above mode for carrying out the present invention, the bead core 16 is used as the receiving and transmitting antenna of the transponder 3. However, it is also possible to use another metallic member such as a steel carcass, belt wire or the like as an antenna, as long as it is a metallic member used in a tire.

As described above, according to the first mode for carrying out the present invention, the transponder 3 is electrically directly connected with a predetermined metallic component member in a tire to use the metallic component member as the receiving and transmitting antenna of the transponder 3. Therefore, it is possible to greatly reduce the loss for transmitting or receiving an electromagnetic wave compared to the case of the conventional electromagnetic induction type and it is unnecessary to provide a special antenna section for the transponder 3. Even if an adjusting antenna is provided for the transponder 3, it is possible to greatly decrease the transponder 3 in size. Moreover, by using a relatively large metallic component member in a tire as an antenna, it is possible to easily access the transponder 3 and to increase a communication distance without increasing the transmission power of an interrogation signal.

Furthermore, by using the bead wire 161 as a metallic component member to be connected with the transponder 3, it is possible to use the bead wire 161 as a coil antenna because the bead wire 161 is generally formed like a coil of tens of turns and to easily and securely receive an interrogation signal output from an interrogator. Thereby, it is possible to increase the communication distance between the interrogator and the transponder 3 without increasing the transmission output (power) of the interrogator.

Furthermore, because the probes 35-1 and 35-2 for electrically directly connecting a metallic component member in a tire with the electronic circuit 32 of the transponder 3 are provided for the transponder 3, it is possible to easily and electrically connect the transponder 3 to a metallic component member such as a bead wire.

Furthermore, because the impedance-matching small antenna 33 is provided for the transponder 3, a very superior advantage is obtained that it is possible to perform impedance matching and adjust a receiving sensitivity in accordance with the size of a metallic component member serving as an antenna or the type of tire.

Then, the second mode for carrying out the present invention is described below by referring to the accompanying drawings.

Figure 10:
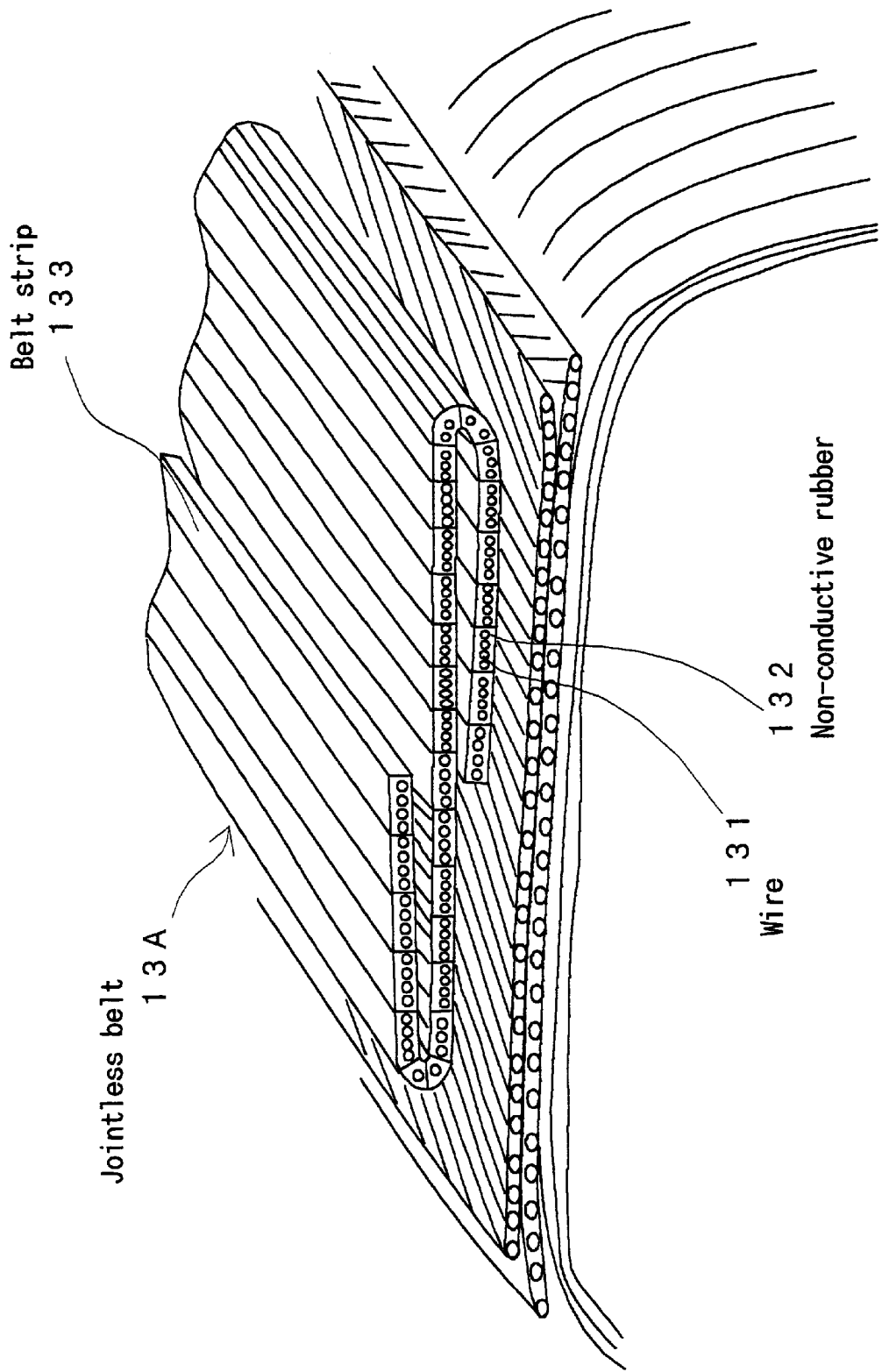
FIG. 10 is a block diagram showing a jointless belt in a mode for carrying out the present invention.

In the case of the second mode for carrying out the present invention, the conductive wire in the jointless belt 13A of the tubeless tire 1 shown in FIG. 1 is used as the transmitting and receiving antenna of the transponder 3. A component same as that in the above first mode for carrying out the present invention is shown with the same symbol in the following explanation. FIG. 10 is a block diagram showing the jointless belt 13A of the tubeless tire 1 shown in FIG. 1.

As shown in FIG. 10, the jointless belt 13A is constituted by winding a belt strip 133 obtained by arranging several wires 131 made of a metallic material such as a brass-plated steel wire on a plane and covering the wires 131 with non-conductive rubber 132 to form them like a belt within a predetermined width on a belt 13 along the circumferential direction of the tire 1.

Moreover, for each piece of rubber constituting a tire, carbon black is generally used as its reinforcement. Therefore, the rubber is conductive. However, to use the wire 131 in the jointless belt 13A provided for the outer periphery in a tire as an antenna, it is necessary to cover the wire 131 with a non-conductive member such as the non-conductive rubber 132 in order to prevent a short circuit. For the non-conductive rubber 132, the material same as the case of the first mode for carrying out the present invention is used.

Figure 11:
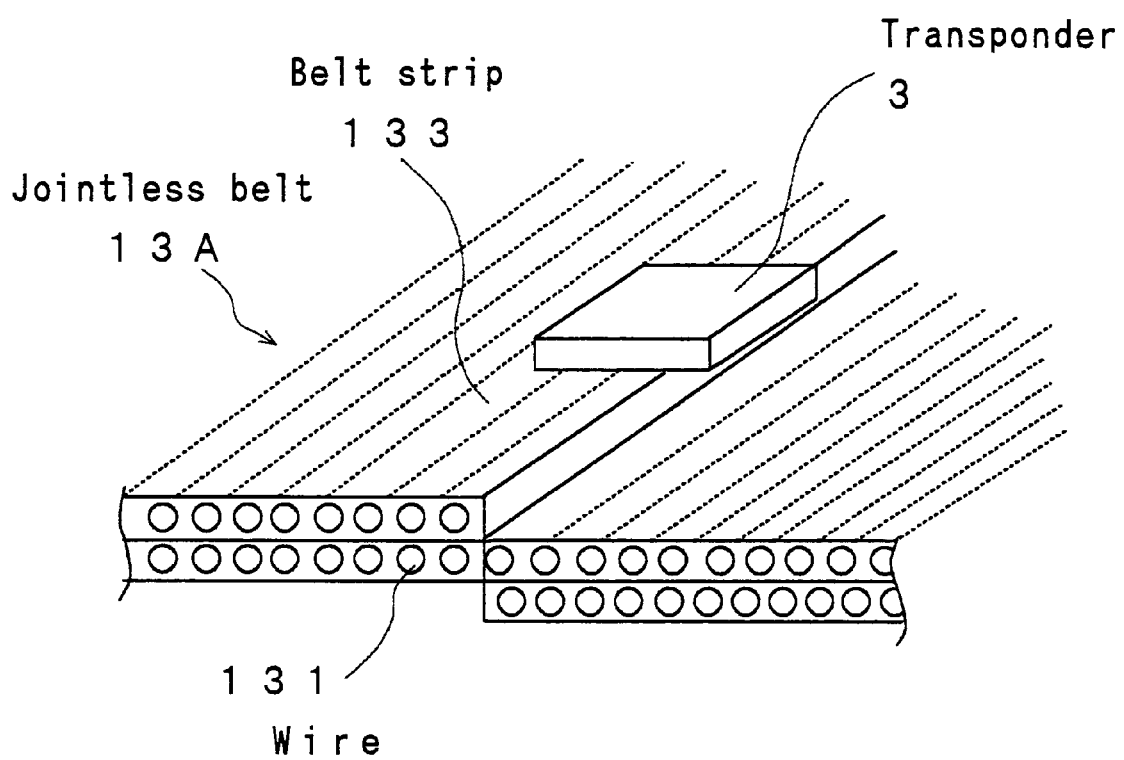
FIG. 11 is an illustration showing a transponder set to a jointless belt in the second mode for carrying out the present invention.

FIG. 11 is an illustration showing the state in which the transponder 3 is set to a part of the jointless belt 13A.

The structure of the transponder 3 is the same as the case of the above first mode for carrying out the present invention.

In the case of the transponder 3, the wire 131 and the electronic circuit of the transponder 3 are electrically directly connected each other and fixed in order to use the wire 131 in the jointless belt 13A as a receiving and transmitting antenna.

As described above, the jointless belt 13A is constituted by winding the belt strip 133 obtained by bundling a plurality of wires 131 by tens of turns. When the wire 131 is constituted of a conductive metallic material such as a steel wire, it is possible to generate an electromotive force of electromagnetic induction.

In the case of this mode for carrying out the present invention, terminal machining is applied to the originating end and terminating end of the wire 131 so that the ends can be connected with the probes 35-1 and 35-2 of the transponder 3. The originating end and terminating end of the wire 131 is provided in almost the same place so that the ends can be easily connected with the probes 35-1 and 35-2 of the transponder 3.

When setting the transponder 3 to a tire, the probes 35-1 and 35-2 are respectively electrically connected to the originating end and terminating end of the wire 131 and bonded and fixed to a predetermined member in the tire by applying an adhesive to the bonding portion 3B. Thereby, the wire 131 in the jointless belt 13A is used as the receiving and transmitting antenna of the transponder 3.

In this case, the structure of a transponder is slightly different when using the wire 131 as a so-called electromagnetic coupling antenna and when using the wire 131 as an electric-field coupling antenna similarly to the case of the above first mode for carrying the present invention.

Figure 12:
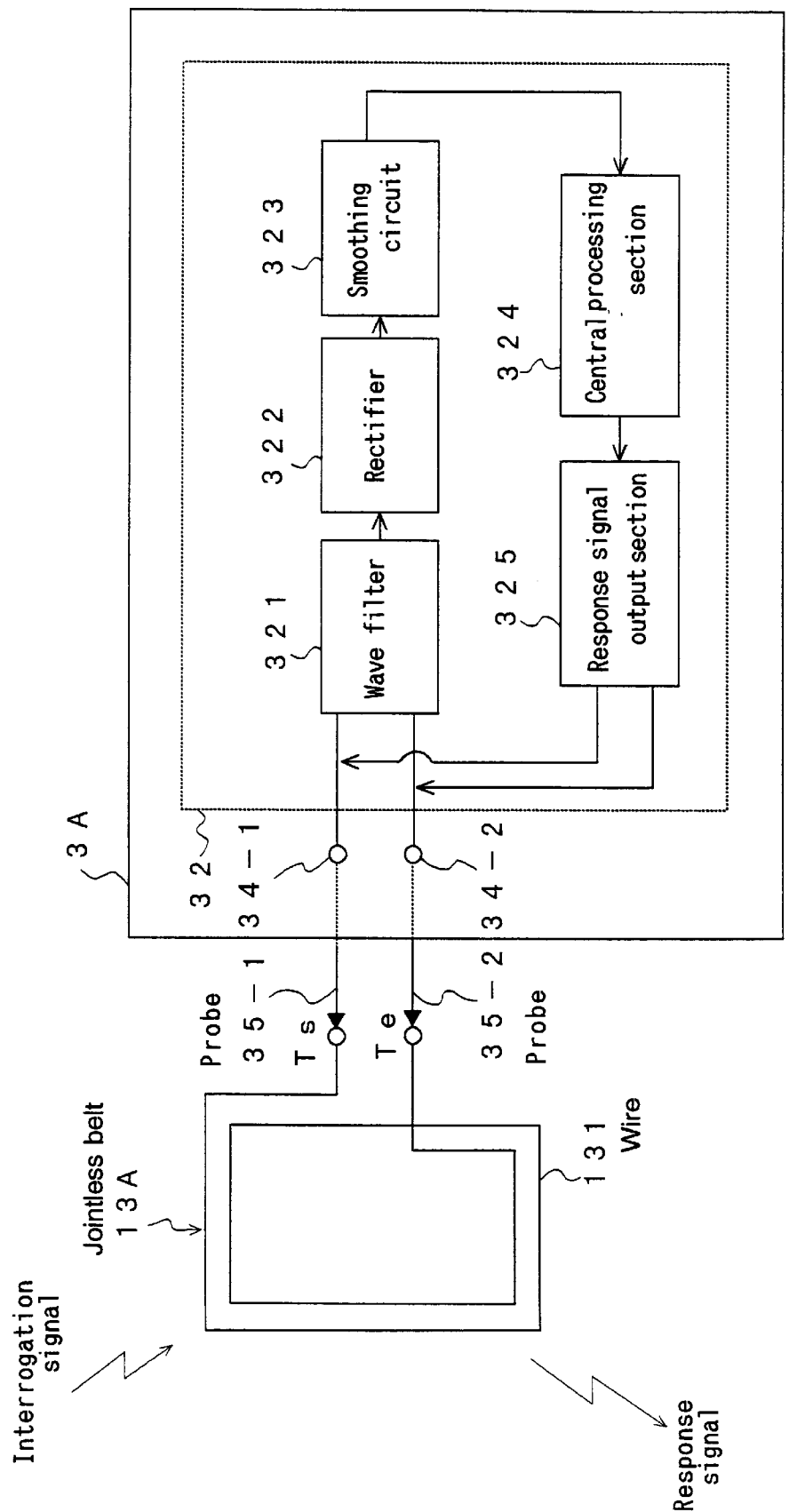
FIG. 12 is a block diagram including the electric circuit of a transponder when using a wire as an electromagnetic coupling antenna in the second mode for carrying out the present invention.

That is, when using the wire 131 as the electromagnetic coupling antenna of the transponder 3, the probes 35-1 and 35-2 connected with the terminals 34-1 and 34-2 of the transponder body 3A are respectively connected to the terminal Ts of the originating end of the wire 131 and the terminal Te of the terminating end of it in order to pick up the current flowing through the wire 131 as shown in FIG. 12.

In this case, the impedance-matching small antenna 33 comprising inductance components is set between the terminals 34-1 and 34-2. Thereby, it is possible to improve a receiving sensitivity by changing inductances of the small antenna 33, adjusting the impedance in the closed loop of the electronic circuit 32 (that is, performing impedance matching), and making adjustment so that the reflection of a reception signal is eliminated at a portion where the probe 35 is connected to the wire 131.

Figure 13:
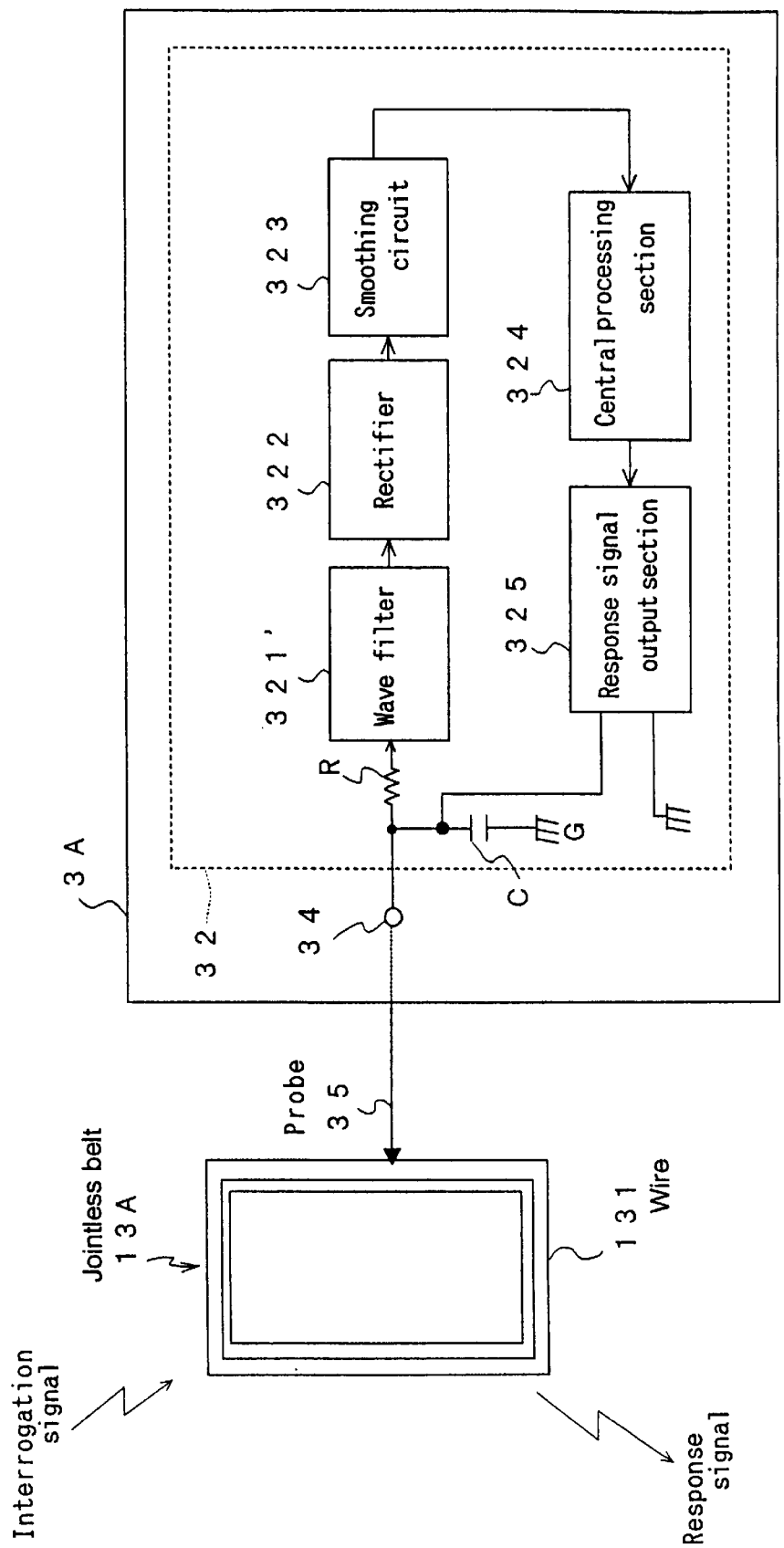
FIG. 13 is a block diagram including the electric circuit of a transponder when using a wire as an electric-field coupling antenna in the second mode for carrying out the present invention.

Moreover, when using the wire 131 as the electric-field coupling antenna of the transponder 3, one probe is provided for the transponder 3 as shown in FIG. 13. Therefore, the transponder 3 and the wire 131 can be connected by inserting the probe 35 into a desired position of the jointless belt 13A and bringing the probe 35 into contact with the wire 131. Specifically, it is necessary to bond and fix the bonding portion 3B to the jointless belt 13A by inserting the probe 35 of the transponder 3 into the wire 131 of the jointless belt 13A.

In this case, the impedance-matching small antenna 33 comprising inductance components is set so as to constitute an LC resonance circuit in parallel with a capacitor C. Thereby, it is possible to improve a receiving sensitivity by changing inductances of the small antenna 33, adjusting the impedance in the closed loop of the electronic circuit 32 (that is, performing impedance matching), and eliminating the reflection of a reception signal at a portion where the probe 35 is connected to the wire 131.

Moreover, when it is intended to use the second mode for carrying out the present invention only for a tire provided with the jointless belt 13A having a predetermined inside diameter, it is not always necessary to set the impedance-matching small antenna 33 to the transponder 3.

The operation of the transponder 3 used for the transponder-provided tire 1 comprising the above structure is the same as that of the first mode for carrying out the present invention and therefore, its description is omitted.

Moreover, in the case of the second mode for carrying out the present invention, the same advantage as that of the first mode for carrying out the present invention can be obtained.

Figure 14:
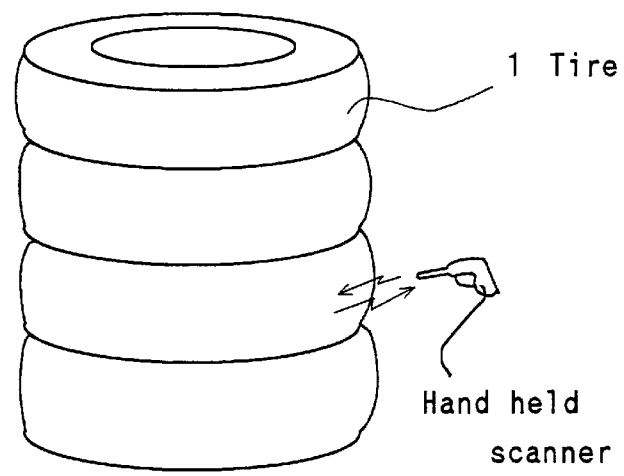
FIGS. 14 and 15 are illustrations for explaining the easiness of transponder access in the second mode for carrying out the present invention.

Furthermore, in the case of the second mode for carrying out the present invention, the wire 131 in the jointless belt 13A set to the outer periphery in a tire is used as the transmitting and receiving antenna of the transponder 3. Therefore, also when stacking the tire 1 as shown in FIG. 14, the transponder 3 can be accessed by a small-output hand-held scanner.

Figure 15:
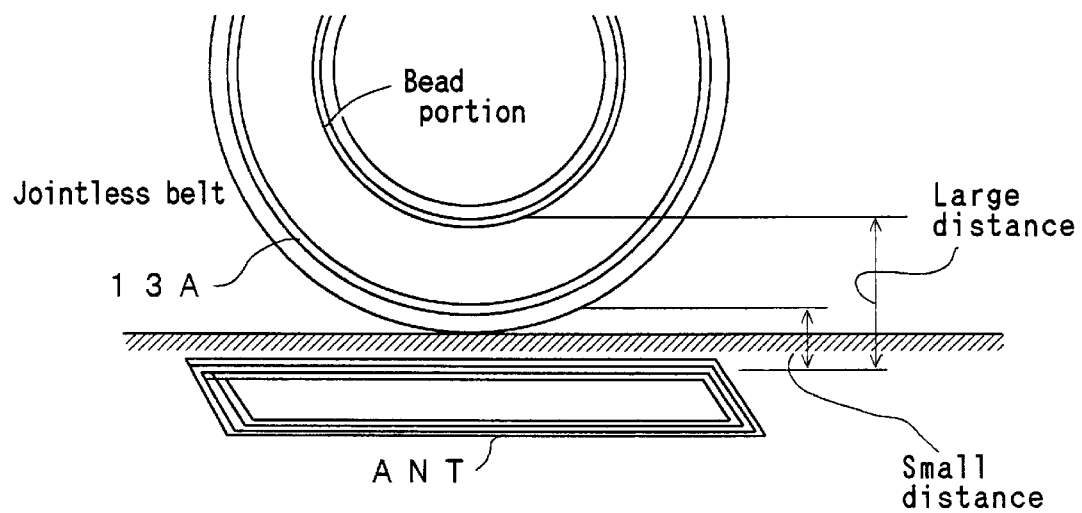

Furthermore, as shown in FIG. 15, it is possible to easily access the transponder 3 in the tire 1 by embedding the antenna ANT of an interrogator in a road. In this case, it is possible to more easily access the transponder 3 because the distance between the transponder 3 and the antenna ANT under the road decreases when using the jointless belt 13A as an antenna compared to the case of using the bead portion as the antenna of the transponder 3.

The structure of the transponder 3 in the above mode for carrying out the present invention is an example. Therefore, the present invention is not restricted to it.

INDUSTRIAL APPLICABILITY

Because a transponder is electrically directly connected with a predetermined metallic component member in a tire and the metallic component member is used as the receiving and transmitting antenna of the transponder, it is unnecessary to particularly set an antenna portion to the transponder 3. Even if an adjusting antenna is set, it is possible to greatly decrease a transponder in size. Moreover, by using a relative large metallic component member in a tire such as a bead wire or a conductive wire in a jointless belt as an antenna, it is possible to greatly reduce the loss for transmitting or receiving electromagnetic waves compared to the case of the conventional electromagnetic induction type. Therefore, the transponder in a tire can easily and securely receive an interrogation signal output from an interrogator. Moreover, it is possible to easily access the transponder from the outside of the tire and to increase a communication distance without increasing the transmission power of an interrogation signal.

Furthermore, by setting a probe for electrically connecting the metallic component member in a tire with the electronic circuit of a transponder to the transponder, it is possible to easily electrically connect the transponder to a metallic component member such as a bead wire.

Furthermore, by setting an impedance-matching small antenna to a transponder, it is possible to performing impedance matching in accordance with the size of a metallic component member to serve as an antenna or the type of tire and therefore, it is possible to improve the receiving sensitivity.

What is claimed is:

1. A transponder-provided tire characterized by electrically directly connecting the electronic circuit of a transponder requiring an antenna with a predetermined metallic component member of the tire and thereby, using said metallic component member as the antenna of said transponder.

2. A transponder-provided tire according to claim 1, wherein a bead wire is used as the metallic component member for the antenna to be connected with the electronic circuit of said transponder and said bead wire is covered with a non-conductive member.

3. A transponder-provided tire according to claim 1, wherein said tire is provided with a jointless belt constituted by winding a belt strip obtained by covering a conductive wire extending in the circumferential direction of said tire with rubber on the outer periphery in said tire along the circumferential direction of said tire, and the conductive wire of said jointless belt is the metallic component member for the antenna of said transponder and non-conductive rubber is used for the rubber of said belt strip.

4. A tire transponder to be set in a tire characterized by setting a probe for electrically directly connecting an antenna terminal in the electronic circuit of said transponder to a predetermined metallic component member in said tire to said transponder.

5. A tire transponder according to claim 4, including a small antenna for impedance matching between said electronic circuit and said metallic component member used as said antenna.

* * * * *